(12) United States Patent
Fernandez (10) Patent No.: US 11,796,129 B1
(45) Date of Patent: Oct. 24, 2023

(54) RETROGRADE FLOW LUBRICATION SYSTEM

(71) Applicant: Eric Albert Fernandez, Waynesboro, VA (US)

(72) Inventor: Eric Albert Fernandez, Waynesboro, VA (US)

(*) Notice: Subject to any disclaimer, the term of this patent is extended or adjusted under 35 U.S.C. 154(b) by 0 days.

(21) Appl. No.: 17/877,980

(22) Filed: Jul. 31, 2022

Related U.S. Application Data (60) Provisional application No. 63/316,753, filed on Mar. 4, 2022.

(51) Int. Cl.
*F16N 11/10* (2006.01)
*F01P 11/12* (2006.01)
*F01P 7/14* (2006.01)

(52) U.S. Cl.
CPC .............. *F16N 11/10* (2013.01); *F01P 7/14* (2013.01); *F01P 11/12* (2013.01); *F16N 2270/60* (2013.01)

(58) Field of Classification Search
CPC .................. F16N 11/10; F01P 11/12
See application file for complete search history.

(56) References Cited

U.S. PATENT DOCUMENTS

| 5,042,618 A * | 8/1991 | Switalski ............... F16N 7/32 |
| | | 184/6.14 |
| 5,282,372 A * | 2/1994 | Gutschmit ............ D04B 35/28 |
| | | 15/302 |
| 5,344,311 A * | 9/1994 | Black ..................... F23K 5/04 |
| | | 431/278 |
| 6,276,334 B1 * | 8/2001 | Flynn ..................... F02B 29/00 |
| | | 701/102 |
| 2007/0119422 A1 * | 5/2007 | Lewis .................... F02M 25/10 |
| | | 123/295 |
| 2008/0023051 A1 * | 1/2008 | Yoshimura ............. C23G 5/00 |
| | | 134/198 |
| 2014/0326225 A1 * | 11/2014 | Shioda .................... F02B 67/04 |
| | | 123/559.1 |
| 2016/0230640 A1 * | 8/2016 | Kamimura ............... F02F 1/14 |
| 2017/0145962 A1 * | 5/2017 | Dudar ................ F02M 25/0872 |
| 2018/0252170 A1 * | 9/2018 | Hashimoto ......... F02D 13/0215 |

* cited by examiner

*Primary Examiner* — Long T Tran (57) ABSTRACT

Certain exemplary embodiments can provide a system comprising a pressurized air source, a pressure regulator, an air flow control solenoid valve, a wastegate assembly, a reservoir assembly, a filter, a coolant flow control solenoid valve, a mixer assembly, and an outlet assembly. The pressure regulator is constructed to control a pressure of air from the air source. The wastegate assembly is constructed to control air pressure in the reservoir assembly. The filter is constructed to remove impurities from a coolant stream.

5 Claims, 8 Drawing Sheets

RETROGRADE FLOW LUBRICATION SYSTEM

CROSS-REFERENCES TO RELATED APPLICATIONS

This application claims priority to, and incorporates by reference herein in its entirety, U.S. Provisional Patent Application Ser. No. 63/316,753, filed Mar. 4, 2022.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system comprising a pressurized air source, a pressure regulator, an air flow control solenoid valve, a wastegate assembly, a reservoir assembly, a filter, a coolant flow control solenoid valve, a mixer assembly, and an outlet assembly. The pressure is regulator constructed to control a pressure of air from the air source. The pressure regulator is constructed to regulate an equal or higher air pressure source to a desired pressure. The wastegate assembly is constructed to relieve air to the atmosphere from the reservoir assembly. The filter is constructed to remove impurities from a coolant stream.

Certain exemplary embodiments provide a mixer that mixes air and coolant. The mixer is constructed to provide an air and coolant mixture to a nozzle. The nozzle is constructed to spray the air and coolant on a surface where machining is occurring.

Lubrication of milling operations is utilized when cutting metals in order to improve tool integrity, surface finish, accuracy, and/or prevent seizure or breakage of an end mill. Certain exemplary embodiments can also be utilized with lathes, saws, and/or other cutting equipment. Certain exemplary embodiments comprise devices that spray air and a coolant or lubricant. Certain exemplary embodiments regulate a relatively low percentage of coolant reliably.

Certain exemplary embodiments provide cost effective and relatively lean lubricant streams. Certain exemplary embodiments improve worker safety, clean up time, corrosion control, a reduced potential for end mill thermal shock, and a smaller environmental footprint.

Certain exemplary embodiments provide:
a) A steady predictable blend of air and coolant at coolant flow rates down to approximately 0.4 ounce (i.e., approximately 12 milliliters) per hour.
b) No drift of settings over time (partially because there is no close gap needle valve to clog).
c) A relatively high-pressure flow of air to clear chips.
d) Effectively collimated flow to function several inches away.
e) A high exit port velocity from one port delivering both air and coolant, which reduces a probability of outlet clogging.

In certain exemplary embodiments:
a) Air is directed to flow one way, and fluid the opposite way, this creates a balance of pressures, which allows fine regulation of fluid flow. A slight narrowing of the air channel at the point of coolant introduction reduces wasted air from the wastegate setting as a consequence of presenting less pressure differential to be exhausted from the coolant reservoir (for example, FIG. 2 coolant delivery needle 10-9 is an example of narrowing).
b) The differential is achieved by exploiting the fluid's more static (thus more pressurized) condition and ventilating pressure there as a means of calibration.

Certain exemplary embodiments comprise (referencing FIG. 2):
a) A check valve responsive to air flow.
b) Bellcrank 10-11 pivots when the air flows, this allows magnet 10-14 to approach the previously concentric ball 10-5 & o-ring 10-6, dislocating the ball, allowing a coolant flow path.
c) When air stops, the rear magnet pushes the door and closes the fluid side as well. A magnet pair, magnet 10-13 and magnet 10-12, act as a fulcrum to push the bellcrank 10-11 closed and allow concentric ball 10-5 to seal against o-ring 10-6 again with the help of a ring magnet 10-7. This eliminates the adverse effect of coolant filling the mixer after shutting down (due to elasticity of pressurized lines), or coolant from flowing back from the mixer. Each start and stop brings the coolant to air ratio to the proper state much faster with this feature.

Figure 1:
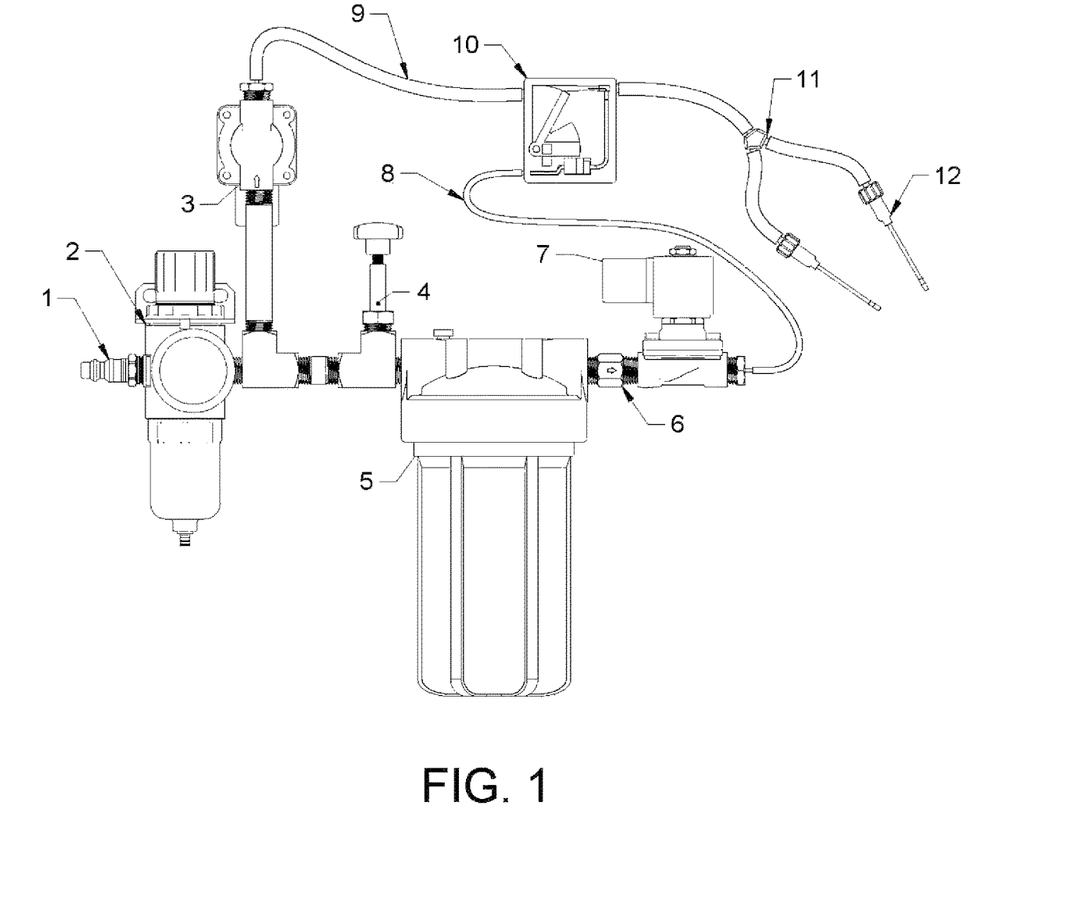
FIG. 1 is a schematic diagram of an exemplary embodiment of a system 1000.

FIG. 1 is a schematic diagram of an exemplary embodiment of a system 1000, which comprises:
pressurized air source 1, represented as a quick disconnect fitting in the illustrated schematic diagram;
filter, water separator, and pressure regulator unit 2;
an air flow control solenoid valve 3 (e.g., a normally closed, 12-volt solenoid valve);
wastegate assembly 4;
coolant reservoir assembly 5 (e.g., a modified water filter reservoir in the illustrated embodiment);
filter 6 (e.g., a 90-micron filter);
a coolant flow control solenoid valve 7 (e.g., a normally closed, 12-volt solenoid valve);
coolant to mixer flexible hose 8 (the smaller diameter hose in this embodiment reduces the surface tension effects of the coolant relative to the hose, whereby a bubble or air-filled region delays the expected transit of coolant);

air to mixer flexible hose 9;
mixer assembly 10 (the cover of which can be optically clear);
mixer to outlet hose assembly and manifold 11; and
outlet assembly 12.

Figure 2:
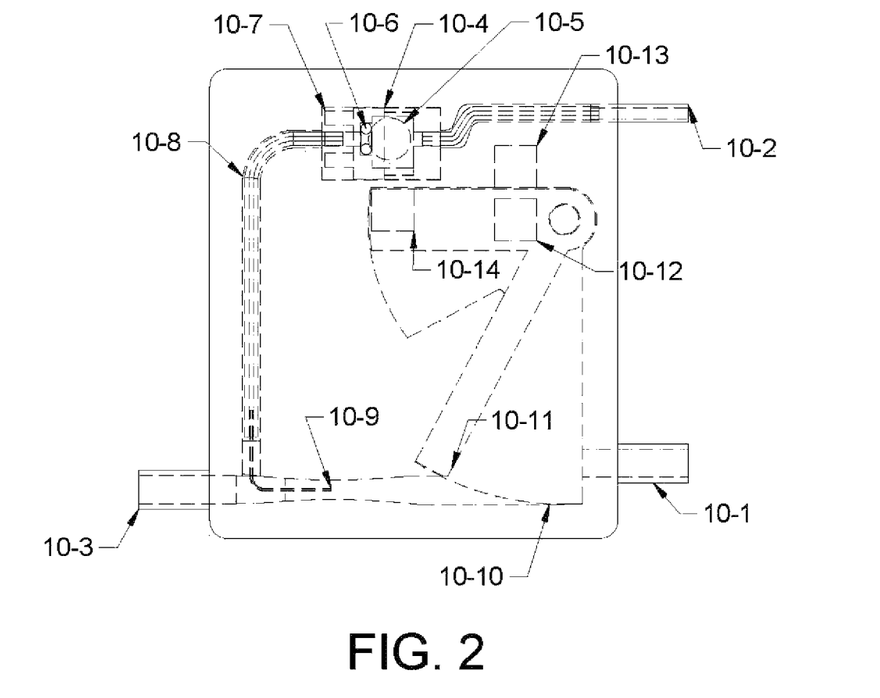
FIG. 2 is a cross-sectional diagram of mixer assembly 10.

FIG. 2 is a cross-sectional diagram of mixer assembly 10, which comprises:
air inlet 10-1;
coolant inlet 10-2;
an outlet 10-3;
a valve body 10-4;
concentric ball 10-5 (in this embodiment a stainless-steel ball 440c grade, which is approximately 3/16 inches in diameter and is magnetically responsive);
o-ring 10-6 (which has a nearly co-planar upper surface to the body in this embodiment, allowing the ball to move laterally when activated);
ring magnet 10-7, which is axially magnetized;
coolant line 10-8 to coolant delivery needle;
coolant delivery needle 10-9, which can have an inner diameter of approximately 0.010";
cavity region 10-10 for bellcrank and air path;
bellcrank 10-11;
magnet 10-12 (mounted on bellcrank), which is oriented to repel neighboring magnet 10-13;
magnet 10-13 (mounted on mixer body), which is oriented to repel neighboring magnet 10-12; and
magnet 10-14 in tension to ball when proximate.

Figure 3:
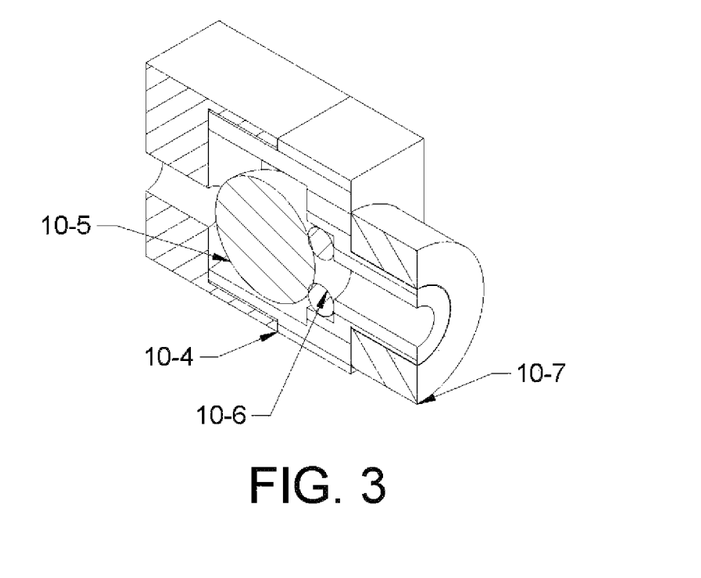
FIG. 3 is an oblique cross-sectional diagram of the valve body of mixer assembly 10.

FIG. 3 is an oblique and cross-sectional diagram of valve body 10-4 which comprises:
valve body 10-4;
concentric ball 10-5;
o-ring 10-6; and
ring magnet 10-7

Figure 4:
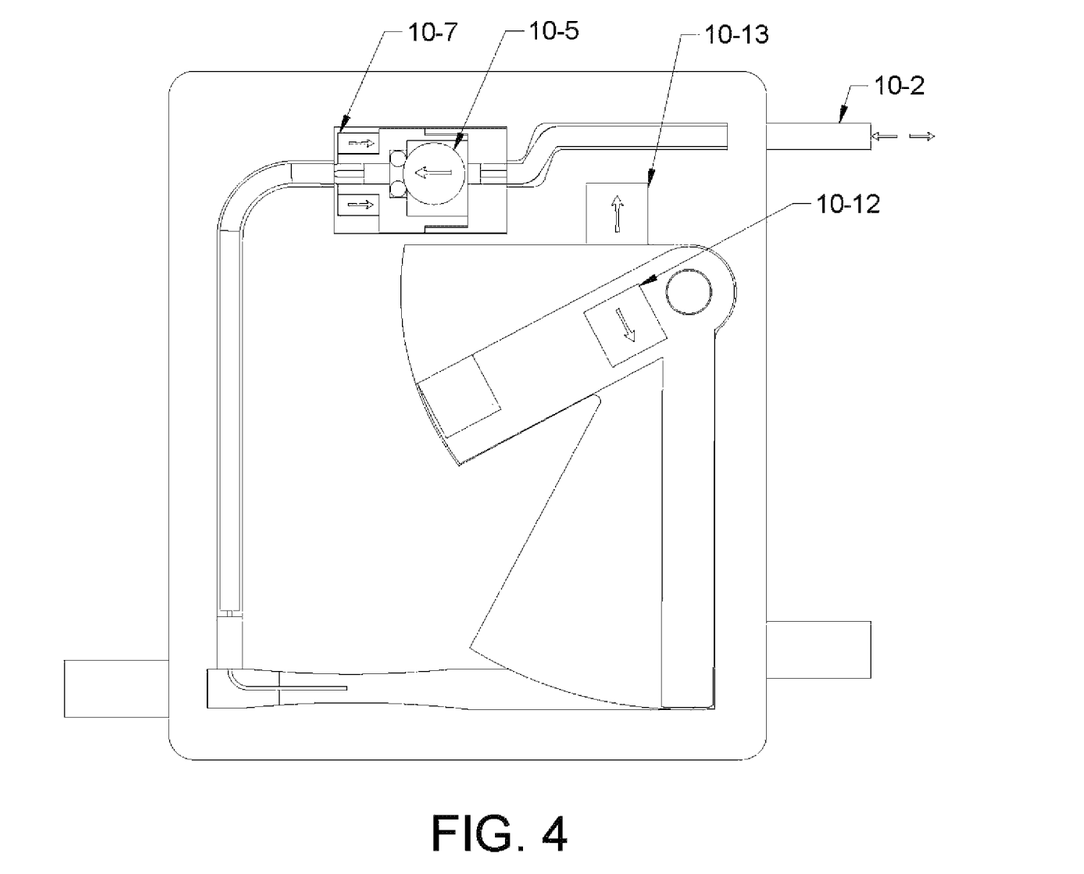
FIG. 4 is a perspective view of mixer assembly 10 of system 1000 in a closed position; arrows over magnets represent magnetic pull; arrows at inlet 10-2 represent a potential for bi-directional pressure.

FIG. 4 is a cross-sectional diagram of mixer 10 in the normally closed state, which comprises:
coolant inlet 10-2 experiencing bi-directional stoppage of flow;
concentric ball 10-5 being seated against o-ring 10-6 with the assistance of ring magnet 10-7 (arrows indicate magnetic pull); and
magnet 10-12 and magnet 10-13 repelling each other (arrows indicate magnetic pull.

Figure 5:
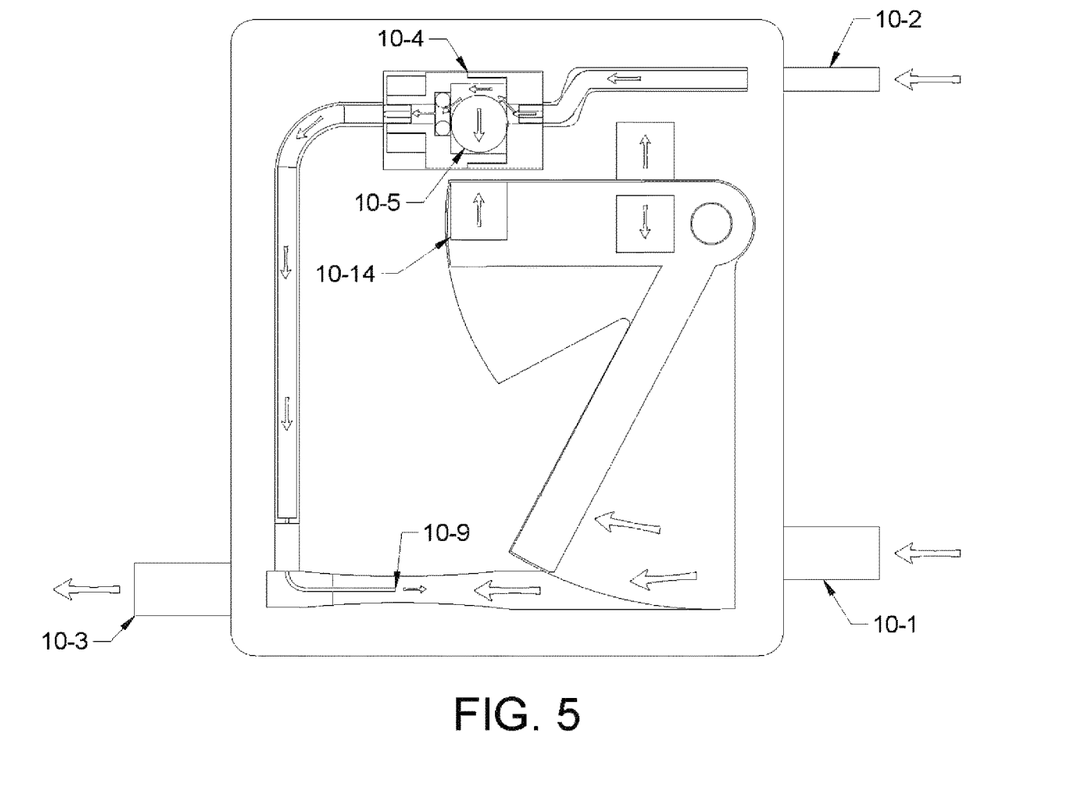
FIG. 5 is a perspective view of mixer assembly 10 of system 1000 in an open position; arrows over magnets represent magnetic pull; other arrows represent flow of a fluid.

FIG. 5 is a cross-sectional diagram of mixer 10 in the open state, which comprises:
air inlet 10-1 experiencing both pressure and flow into mixer assembly 10;
coolant inlet 10-2 experiencing both pressure and flow into mixer assembly 10;
outlet 10-3 experiencing flow out of mixer assembly 10;
valve body 10-4 experiencing flow around concentric ball 10-5 as a result of concentric ball 10-5 being magnetically pulled toward magnet 10-14 (flow is indicated by the plurality of small arrows); and
coolant delivery needle 10-9 delivering coolant into the incoming air stream (coolant flow direction is represented by a small arrow, air by the large arrows).

Figure 6:
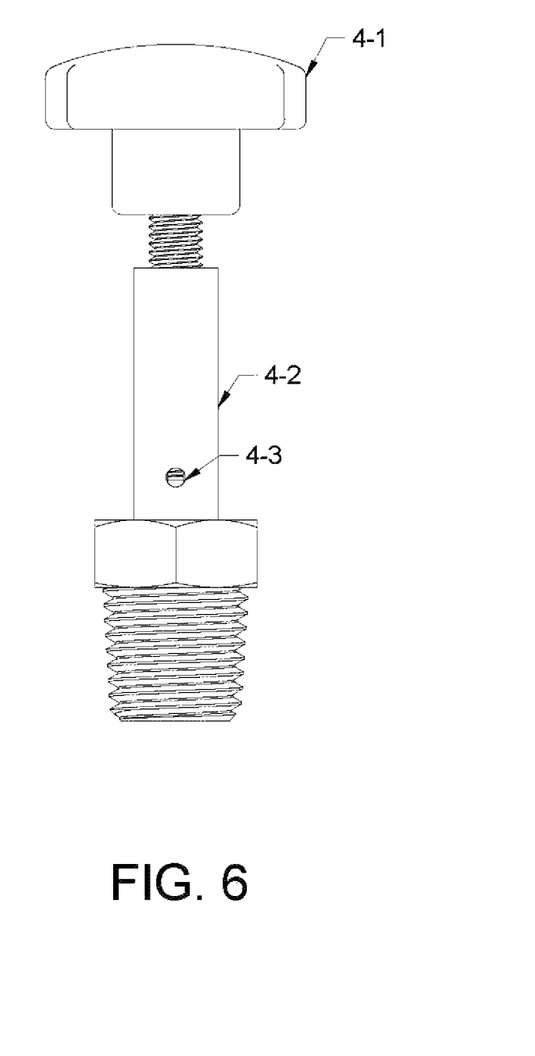
FIG. 6 is a perspective view of the wastegate assembly 4 of system 1000.

FIG. 6 is a perspective view of wastegate assembly 4, which comprises:
knob 4-1, which is constructed to control setting of bleed air, knob 4-1 is illustrated in this embodiment as a M5 threaded shaft (e.g., a stainless shaft);
housing 4-2 of wastegate assembly 4, housing 4-2 is illustrated in this embodiment as a nylon plastic tube with M5 threads; and
orifice 4-3, which is illustrated in this embodiment is illustrated as a 0.078" hole in on one side only.

Figure 7:
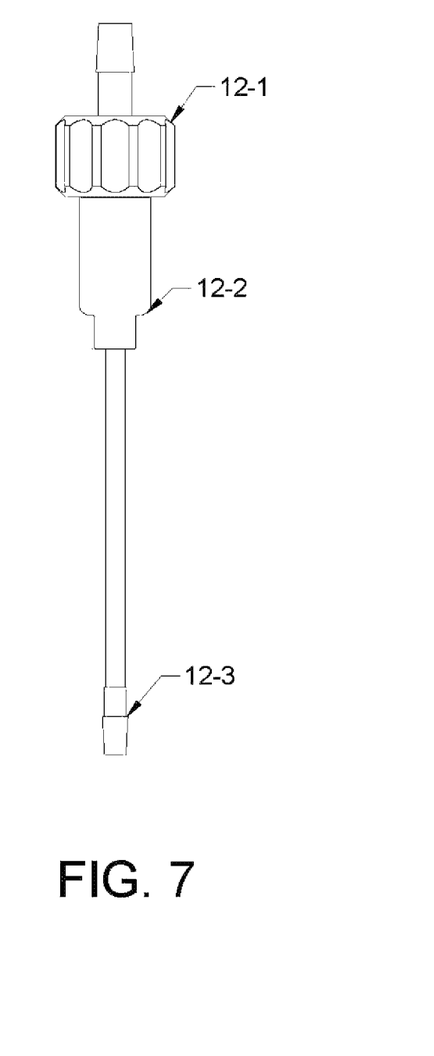
FIG. 7 is a perspective view of outlet nozzle 12 of system 1000.

FIG. 7 is a perspective view of outlet assembly 12, which comprises:
luer lock base 12-1;
luer lock 12-2, which can be a 0.032" inner diameter by 1.5" long dispensing needle that weighs approximately 19 grams; and
nozzle 12-3, which can be anti-sputtering and have a shape of a frustrum of a cone and can be constructed of low surface energy plastic. Nozzle 12-3 is constructed to substantially eliminate droplet collection and sputtering as a result of surface energy present in stainless steel.

Figure 8:
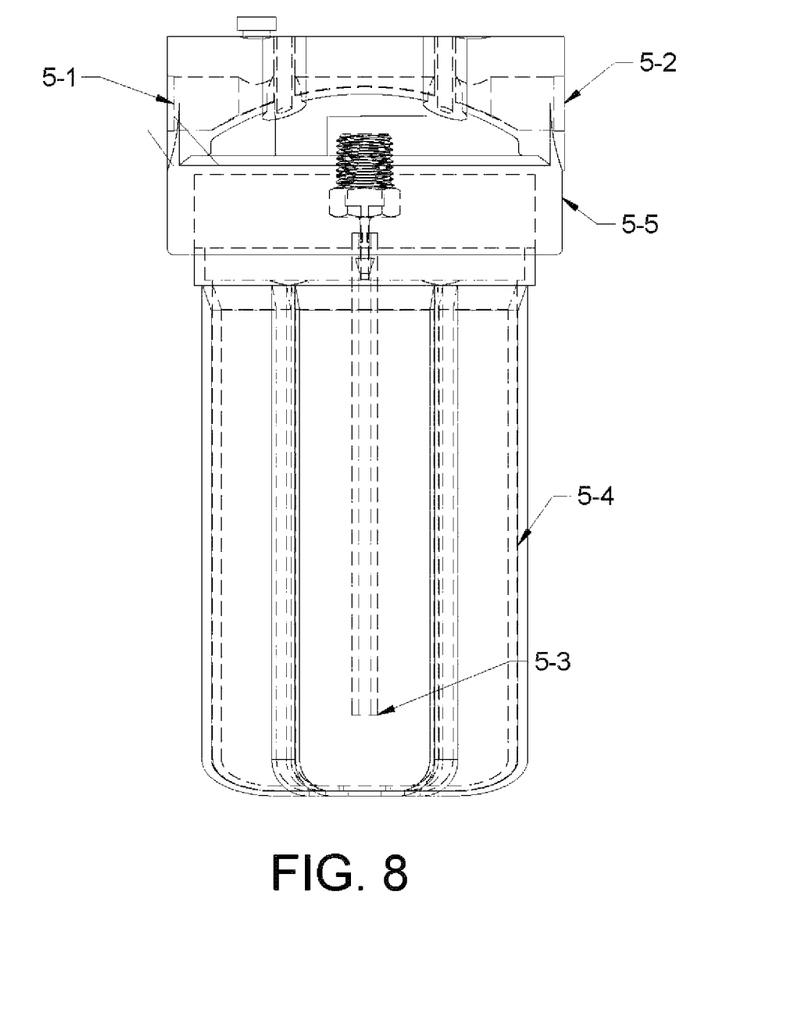
FIG. 8 is a side view with hidden lines visible of the liquid reservoir 5 of system 1000.

FIG. 8 is a side view with hidden lines visible of the coolant reservoir assembly 5, which comprises:
reservoir air inlet 5-1;
reservoir outlet 5-2;
reservoir pickup line 5-3;
reservoir bowl 5-4; and
reservoir housing 5-5

Figure 9:
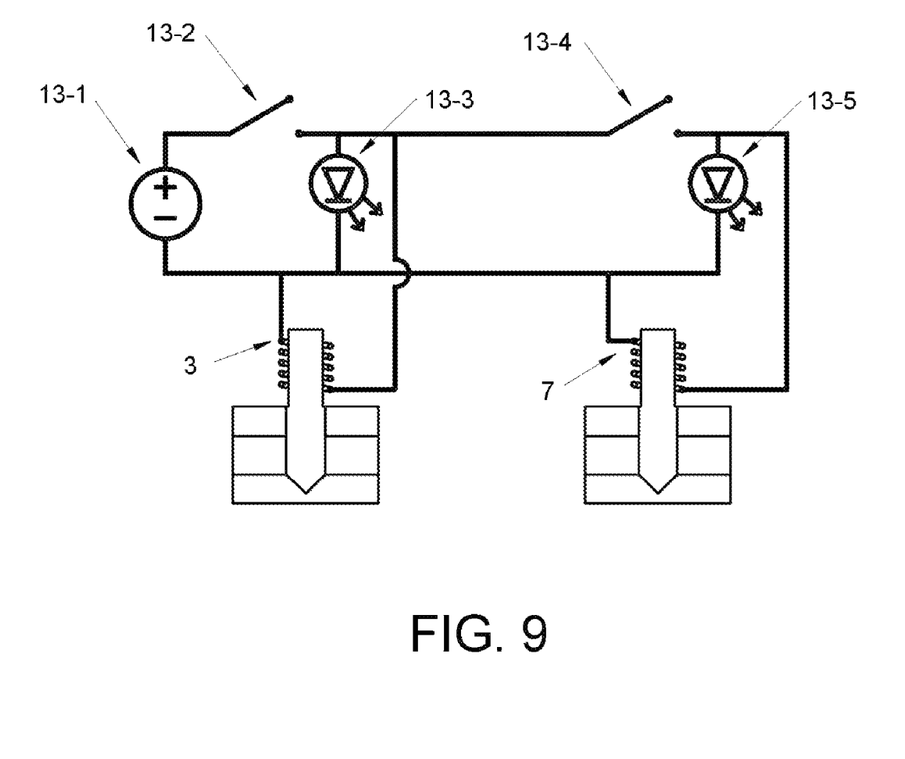
FIG. 9 is an electrical schematic drawing of system 1000 operating under a DC power source.

FIG. 9 is an electrical schematic diagram of system 1000, if equipped with electronic solenoids & switches, which comprises:
DC voltage source 13-1;
Power switch 13-2;
Power indication LED lamp 13-3;
Coolant flow switch 13-4, which activates simultaneously with the power switch in cases when the coolant is desired as well as air;
Coolant flow indication LED lamp 13-5;
Air flow control solenoid valve 3; and
Coolant flow control solenoid valve 7.

Figure 10:
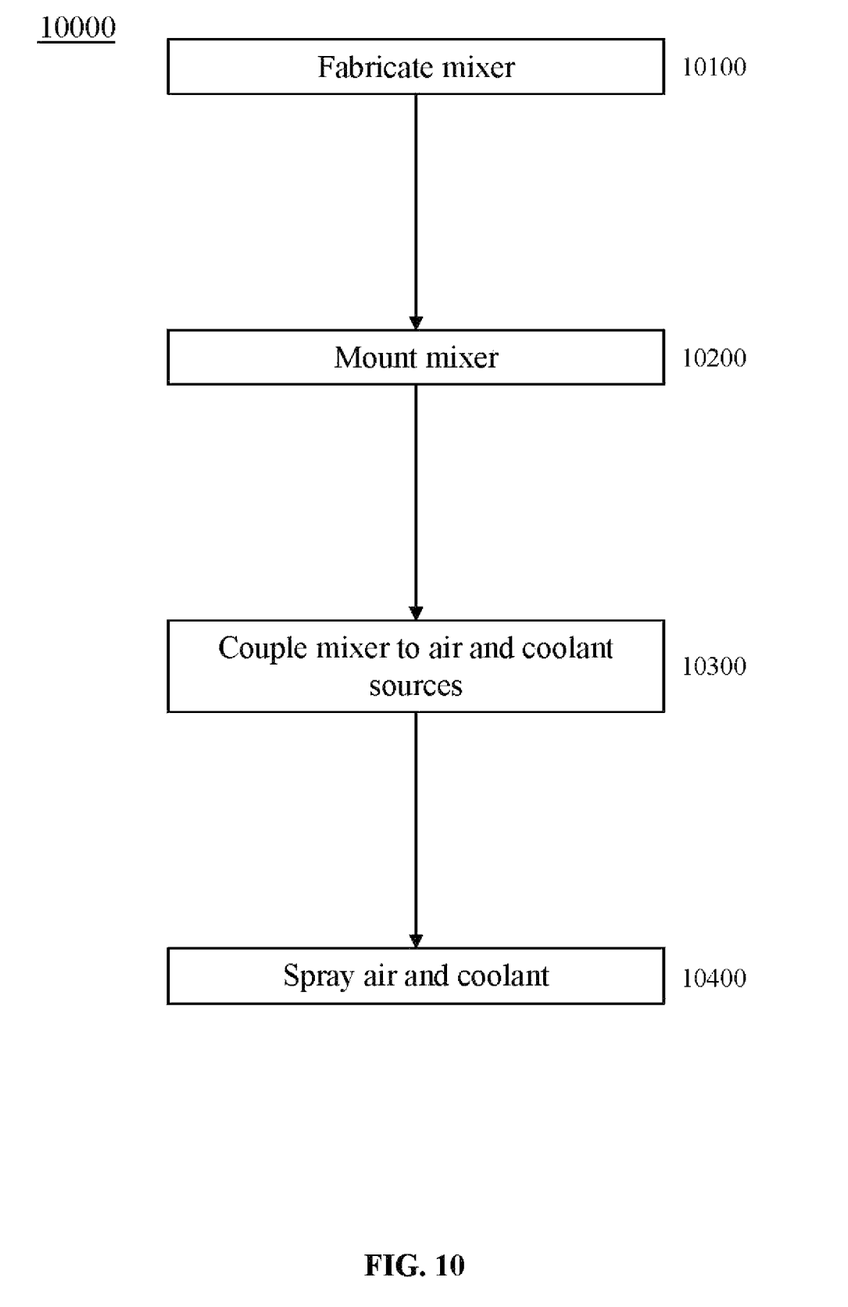
FIG. 10 is a flowchart of an exemplary embodiment of a method 10000. At activity 10100, a mixer is fabricated.

FIG. 10 is a flowchart of an exemplary embodiment of a method 10000. At activity 10100, a mixer is fabricated. At activity 10200, the mixer is mounted in proximity to a machining system. At activity 10300, the mixer is coupled to air and coolant sources. At activity 11400, the mixer sprays air and coolant on a surface where machining is occurring.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
adapted to—made suitable or fit for a specific use or situation.
adapter—a device used to effect operative compatibility between different parts of one or more pieces of an apparatus or system.
air—the mixture of invisible odorless tasteless gases, comprising nitrogen and oxygen, which surrounds the earth.
and/or—either in conjunction with or in alternative to.
anti-sputtering—resistant to particles being briefly collected, then ejected from a surface of a solid material.
apparatus—an appliance or device for a particular purpose.
assembly—a set of components.
associate—to join, connect together, and/or relate.

ball valve—a flow control device which uses a hollow, perforated and pivoting ball to control liquid flowing through it.
base—a supporting portion of something.
bellcrank—a type of an arm coupled at a right angle to a rotating shaft by which circular motion is imparted to or received from the shaft that changes motion through an angle.
bleed air—air that is extracted from an air flow stream.
can—is capable of, in at least some embodiments.
cause—to produce an effect.
circuit—an electrically conductive pathway and/or a communications connection established across two or more switching devices comprised by a network and between corresponding end systems connected to, but not comprised by the network.
collimate—to make substantially parallel.
comprising—including but not limited to.
configure—to make suitable or fit for a specific use or situation.
connect—to join or fasten together.
constructed to—made to and/or designed to.
control—to adjust a parameter.
convert—to transform, adapt, and/or change.
coolant—any liquid passed thru a system which attempts to cool or/and or lubricate a cutting operation, a coolant can comprise a small amount of coolant mixed with water, special vegetable oils, various undiluted oils, and/or alcohols, etc.
couple—to link in some fashion.
coupleable—capable of being joined, connected, and/or linked together.
create—to bring into being.
define—to establish the outline, form, or structure of.
delay— (n) a slower than normal occurrence; (v) to occur more slowly than normal.
deliver—to provide something at a predetermined location.
determine—to obtain, calculate, decide, deduce, and/or ascertain.
device—a machine, manufacture, and/or collection thereof
dispense—to distribute.
end mill—a type of milling cutter used in industrial milling applications.
ensure—to make certain.
equilibrium—a state of balance between opposing forces.
event—something that happens.
filter— (n) a device constructed to restrict passage of something entrained in a fluid stream; (v) to restrict passage of something entrained in a fluid stream.
flexible—capable of bending without breaking.
flood—an undesirably large flow.
flow—a circulation or motion of a fluid.
fluid—a liquid and/or gas.
frustum of a cone—a portion of a cone that lies between one or two parallel planes cutting through round sections of the cone.
hose—a flexible tube.
housing—an enclosing, covering, protecting, and/or supporting frame, box, and/or chassis.
impurity—a substance present in a fluid that is not desired in the fluid.
inlet—an entrance passage.
install—to connect or set in position and prepare for use.
knob—a rounded handle or dial.
lean proportion—a relatively small quantity relative to mixed air.
liquid—a fluid (such as water) that has no independent shape but has a definite volume and does not expand indefinitely and that is only slightly compressible.
lubrication—an application of a substance capable of reducing friction, heat, and wear when introduced as a film on a solid surface.
luer lock—a coupling comprising a tabbed hub on a female fitting which engages with threads in a sleeve on a male fitting.
machining—the process of cutting, shaping, and/or finishing by machine.
magnet—a material or object that produces a magnetic field.
may—is allowed and/or permitted to, in at least some embodiments.
method—a process, procedure, and/or collection of related activities for accomplishing something.
mix—to combine or blend.
mixer—a device constructed to combine or blend substances.
mixture—blended substances.
needle—a slender hollow device used to introduce a substance into a fluid stream.
nozzle—a component that accelerates a fluid from a lower velocity to a higher velocity.
occur—to take place.
orifice—an opening through which a substance passes.
outlet—an exit passage.
plurality—the state of being plural and/or more than one.
predetermined—established in advance.
pressure—a measure of force applied uniformly over a surface.
pressurized—having a predetermined force per unit area.
proportion—a relation of one part to another with respect to quantity.
provide—to furnish, supply, give, and/or make available.
reach—to achieve.
receive—to get, take, acquire, and/or obtain.
redundant—exceeding what is necessary.
regulate—to control.
regulation—control.
regulator—a device constructed to control something.
repeatedly—again and again; repetitively.
reservoir—a container in which a liquid is stored.
retrograde—occurring or performed in a direction opposite to the normal or forward direction of flow.
separator—a system constructed to extract something from a fluid stream.
set—a related plurality.
shaft—a stem that connects portions of a device.
solenoid valve—an electromechanically operated device that regulates, directs or controls the flow of a fluid by opening, closing, or partially obstructing various passageways.
source—an origin of something.
start—to begin a flow.
stop—to end a flow.
store—to place, hold, and/or retain.
stream—a flow of matter.
strict—stringent in control.
substantially—to a great extent or degree.
support—to bear the weight of, especially from below.
surface—the outer boundary of an object or a material layer.

system—a collection of mechanisms, devices, machines, articles of manufacture, processes, data, and/or instructions, the collection designed to perform one or more specific functions.

through—moving in a first side of something and to a second side thereof.

transmit—to send, provide, furnish, and/or supply.

valve—a device by which the flow of a fluid is started, stopped, and/or regulated by a movable part that opens, shuts, or partially obstructs one or more ports or passageways.

via—by way of and/or utilizing.

wastegate— A valve which exhausts air from a pressurized coolant supply subsystem with the goal of calibrating pressures, to effect a change in flow rate.

without—substantially lacking.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:

a pressurized air source;

a pressure regulator, the pressure regulator constructed to control a pressure of air from the air source;

an air flow control solenoid valve;

a wastegate assembly;

a reservoir assembly, the wastegate assembly constructed to control air pressure in the reservoir assembly;

a filter, the filter constructed to remove impurities from a coolant stream;

a coolant flow control solenoid valve;

a mixer assembly, the mixer assembly constructed to mix coolant and air, the mixer assembly constructed to regulate a proportion of coolant mixed with air, and also to redundantly start-stop coolant flow to ensure that system start-stop events reach delivery equilibrium without delay or flooding, the air flow control solenoid valve constructed to start and stop a flow of air to the mixer assembly, the coolant flow control solenoid valve constructed to start and stop a flow of coolant to the mixer assembly; and an outlet assembly, the outlet assembly constructed to receive a mixture of air and coolant from the mixer assembly, the outlet assembly comprising a retrograde flow lubrication mixing nozzle, the retrograde flow lubrication mixing nozzle constructed to deliver the collimated mixture of air and coolant on a surface that is being machined.

2. The system of claim 1, further comprising:

a water separator, the water separator coupled to the pressurized air source.

3. The system of claim 1, further comprising:

an air filter, the air filter coupled to the pressurized air source.

4. The system of claim 1, wherein:

the mixer assembly comprises:

a coolant inlet;

an air inlet;

a ball and bellcrank magnetic valve assembly;

a coolant delivery needle;

an outlet of coolant into an air stream; and a flexible hose, the flexible hose constructed to provide the collimated mixture of air and coolant to the outlet assembly.

5. The system of claim 1, wherein:
the wastegate assembly comprises:
- a knob, the knob constructed to control a setting of bleed air;
- a shaft;
- a housing; and
- an orifice.

* * * * *